United States Patent [19]
Wadell

[11] Patent Number: 5,321,212
[45] Date of Patent: Jun. 14, 1994

[54] OBTAINING, WEIGHING AND DISTRIBUTING PORTIONS OF A PRODUCT

[75] Inventor: Lars G. A. Wadell, Aengelholm, Sweden

[73] Assignee: Nestec S.A., Vevey, Sweden

[21] Appl. No.: 16,854

[22] Filed: Feb. 12, 1993

[30] Foreign Application Priority Data

Mar. 7, 1992 [EP] European Pat. Off. ........ 92103914.5

[51] Int. Cl.⁵ ...................... G01G 13/16; G01G 19/14
[52] U.S. Cl. .................................. 177/25.18; 177/147
[58] Field of Search ........................ 177/1, 25.18, 147

[56] References Cited

U.S. PATENT DOCUMENTS 4,418,772 12/1983 Fukuda ........................ 177/1
4,442,910 4/1984 Mikami ........................ 177/25.18
4,669,557 6/1987 Nakagawa .................... 177/25.18

*Primary Examiner*—George H. Miller, Jr.
*Attorney, Agent, or Firm*—Vogt & O'Donnell

[57] ABSTRACT

Portions of a product are obtained from a supply of the product and are weighed and distributed by an apparatus having a plurality of picking units, a computer and a distribution device. Each picking unit provides for gripping and removing a portion of a product from a supply of the product, for weighing and recording the weight of the removed, gripped portion, and for feeding the recorded weight of the removed, gripped portion to the computer. The computer, which is preprogrammed for a predetermined total weight and to combine a plurality of recorded weights to give a total weight substantially equal to the preprogrammed weight and to actuate release of a combination of portions from the picking units, computes the recorded weights to combine the recorded weights to give a total weight of a combination of a plurality of the portions substantially equal to the preprogrammed weight and then actuates release of the combination of portions which give the total weight for distribution.

10 Claims, 3 Drawing Sheets

OBTAINING, WEIGHING AND DISTRIBUTING PORTIONS OF A PRODUCT

BACKGROUND OF THE INVENTION

The present invention relates to a weighing and distributing apparatus, and more particularly, to an automatic weighing and distributing apparatus which weighs a number of portions of a product and selects a plurality of portions whose combined weights are substantially equal to a preprogrammed weight.

Existing combination weighing machines comprise vibrator chutes to transport the product through the machine and pockets with load cells to weigh the product. Such machines are unsuitable for products such as spaghetti and leaf spinach which tend to stick to the vibrator chute surface and interlace around the chute and pocket edges, as well as for diced products with sticky surfaces which cannot be carried through.

SUMMARY OF THE INVENTION

The present invention provides a weighing and filling apparatus which makes use of picking units and conveyor belts instead of chutes and pockets and provides a process for obtaining and providing a combination of weighed portions of a product.

Accordingly, the present invention provides an apparatus for obtaining weighing and distributing a combination of portions of a product having a predetermined total weight comprising a plurality of picking units each provided with a gripping means and a weighing means, the gripping means being adapted to grip and remove a portion of the product from a supply of the product and the weighing means being adapted to record the weight of the gripped portion, and comprising a distribution means and a computer preprogrammed for the predetermined total weight, whereby the weighing means is adapted to feed the recorded weight to the computer and the computer is programmed to combine a plurality of recorded weights to give a total weight of a combination of a plurality of portions gripped by the gripping means of the picking units substantially equal to the preprogrammed weight and to actuate the combination of picking units gripping the combination of portions having a total weight substantially equal to the preprogrammed weight to release and distribute the combination of portions together on the distribution means.

The process of the present invention, which provides for obtaining a combination of weighed portions of a product, comprises operating a plurality of picking units, each having a product portion gripping means and a weighing means, and gripping and removing a plurality of portions of a product from a supply of the product and weighing and recording a weight of each portion gripped and removed by each picking unit, feeding each recorded weight to a computer preprogrammed for a predetermined total weight and programmed to combine a plurality of the recorded weights to give a total weight of a combination of a plurality of the removed portions gripped by a combination of the gripping means substantially equal to the preprogrammed weight and to arcuate the combination of gripping means to release the combination of removed, gripped portions, computing the recorded weights to combine the recorded weights to give a total weight of a combination of a plurality of the removed portions gripped by a combination of the gripping means substantially equal to the preprogrammed weight and then, actuating the combination of the removed gripping means to release the combination of gripped portions which give the total weight from the gripping means.

DESCRIPTION OF PREFERRED EMBODIMENTS

A wide variety of products may be weighed and distributed by the apparatus of this invention e.g. a food product such as spaghetti, leaf spinach or peas, or a food product which is in particulate form such as a diced or powdered product.

The product supply is preferably stored in a container which may be constantly fed with product to a level within preset limits. The product level may be controlled by an ultrasonic level sensor or by mechanical levelling means.

The gripping means of the picking unit may be a vacuum suction cup or a mechanical grasping hand or claw, e.g. with spoon or finger shaped gripping parts. The upper end of the gripping means is attached to a plunger which is capable of opening and closing the gripping means and which is conveniently activated by a pneumatic cylinder. The weighing means of the picking unit is preferably a load cell.

Each picking unit preferably comprises means for vertical reciprocating movement so that the ,ripping, means can descend to grip a portion product from the supply and then ascend to remove the portion gripped from the remaining product supply as well as means for horizontal reciprocating movement so that the gripping means can transport and release the portion gripped onto the distribution means and then return. The means for vertical and horizontal reciprocating movement may be provided by pneumatic cylinders.

The distribution means may conveniently be provided by one or more, preferably two, conveyors from which the combination of portions is delivered to an outfeed hopper and then to a packaging machine which may be positioned below the outfeed hopper.

The number of picking units used may vary depending on the circumstances. For instance, the minimum number depends on the capacity and accuracy demands while the maximum number may simply be a question of factory space. For example, there may be from 6 to 48 picking units, conveniently from 12 to 36 and preferably from 18 to 30 picking units.

The present invention is illustrated further by way of example only with reference to the accompanying drawings.

BRIEF DESCRIPTION OF THE DRAWINGS FIGURES

DETAILED DESCRIPTION OF THE DRAWING FIGURES

Figure 1:
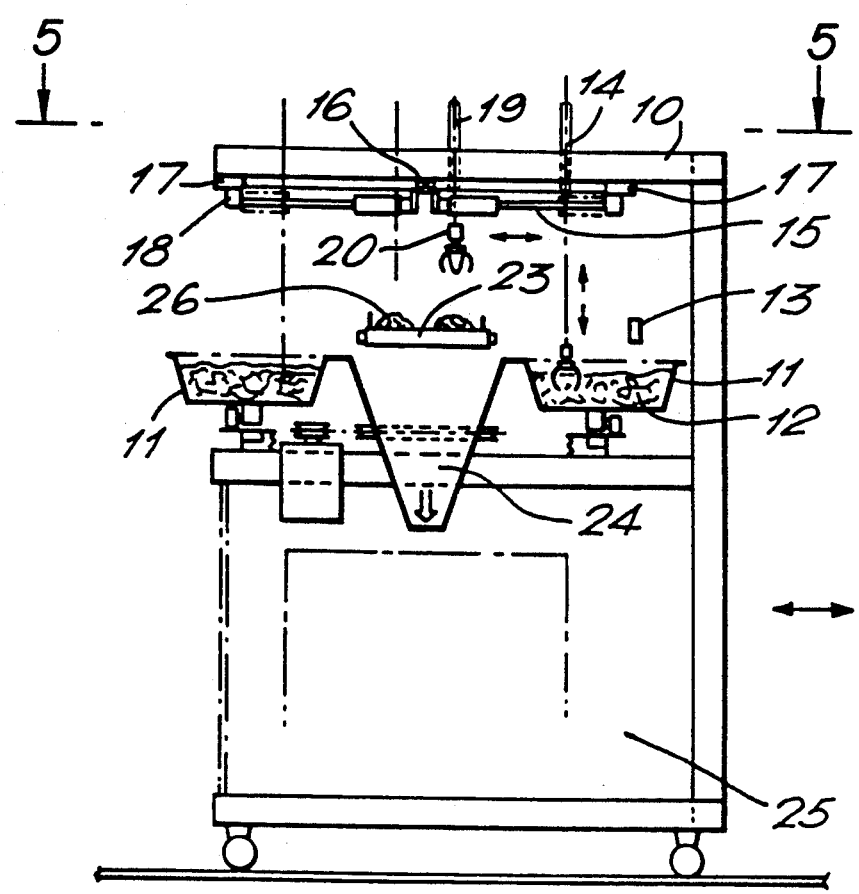
FIG. 1 is a sectional side view of an apparatus according to the invention.

Referrring to the drawings, the apparatus comprises a supporting frame 10, an annular revolving trough 11 for holding the product 12 (cooked spaghetti), an ultrasonic lever sensor 13 which controls an elevator (not shown) feeding the trough 11 to maintain the product level within preset limits, and twenty-four picking units 14. Each picking unit comprising a frame 15 supported at one end by a pivot point 16 and at the opposite end by a load cell 17, a horizontal pneumatic cylinder 18, a vertical pneumatic cylinder 19, a mini-pneumatic cylinder 20, a plunger 21 and finger shaped gripping parts or claws 22.

The apparatus also comprises two conveyor belts 23 travelling in opposite directions in the direction of the arrows (Figured) and a central outfeed hopper 24 (FIG. 1). Beneath the outfeed hopper 24 is a multivac packaging machine 25.

In operation, cooked spaghetti 12 is fed onto the trough 11 from an elevator (not shown) at a rate controlled by the ultrasonic level sensor 13 to maintain the product supply mass level within preset limits. As the trough revolves, the vertical pneumatic cylinders 19 cause the picking units 14 to descend and the mini-cylinders 20 cause the plungers 21 to force the gripping parts 22 to descend into the trough 11 and to close and grip the portions 26 of the cooked spaghetti supply mass 12 and then to ascend and pick up the portions out of the trough. The portions 26 on each picking unit are weighed by the load cells 17 and the weights are recorded and fed to a computer (not shown). The computer, which has been preprogrammed for a predetermined total weight, combines the weights of two or more of the portions 26 on the picking units to give a total weight which is equal to or the closest to the predetermined total weight. The computer then activates the horizontal pneumatic cylinders 18 of the appropriate picking units 14 to cause them to move horizontally to a position above the conveyor belts 23 at which position, the plungers 21 force the gripping parts 22 open to release the portions 26 of cooked spaghetti from the gripping parts 22 onto the conveyor belts 23 from where they fall off the downstream ends into the outfeed hopper 24 and then into the packing machine 25 where the final packaged product contains a combination of portions of cooked spaghetti having a weight equal to or substantially equal to the predetermined total weight.

I claim:

1. An apparatus for obtaining, weighing and distributing portions of a product comprising a plurality of picking units, a computer and a distribution means, wherein each picking unit comprises a gripping means to grip and remove a portion of a product from a supply of the product and comprises a weighing means to weigh and record a weight of the removed, gripped portion and to feed the recorded weight to the computer and wherein the computer is preprogrammed for a predetermined total weight and programmed to combine a plurality of the recorded weights to give a total weight of a combination of a plurality of the removed portions gripped by a combination of gripping means substantially equal to the preprogrammed weight and to actuate the combination of gripping means to release the combination of removed, gripped portions which give the total weight and wherein the distribution means is positioned for receiving the combination of released portions.

2. An apparatus according to claim 1 further comprising a container for containing the product supply and a level sensor for maintaining a product level of the product supply within the container within preset limits.

3. An apparatus according to claim 1 wherein the gripping means comprises a mechanical grasping hand, or claw, or a vacuum suction cup.

4. An apparatus according to claim 1 wherein the weighing means comprises a load cell.

5. An apparatus according to claim 1 further comprising means for vertically reciprocating each picking unit to descent to grip the pro- duct portion and then to ascent to remove the gripped portion from the product supply.

6. An apparatus according to claim 1 further comprising means for horizontally reciprocating each picking unit to transport the removed, gripped portion horizontally from the product supply to the distribution means for release of the removed, gripped portion and then to return to the product supply.

7. An apparatus according to claim 1 wherein the distribution means is a conveyor.

8. An apparatus according to claim 1 further comprising a hopper positioned for receiving released portions from the distribution means.

9. An apparatus according to claim 8 further comprising a packaging machine positioned for receiving released portions from the hopper.

10. A process for obtaining and providing a combination of weighed portions of a product comprising operating a plurality of picking units, each having a product portion gripping means and a weighing means, and gripping and removing a plurality of portions of a product from a supply of the product and weighing and recording a weight of each portion gripped and removed by each picking unit, feeding each recorded weight to a computer preprogrammed for a predetermined total weight and programmed to combine a plurality of the recorded weights to give a total weight of a combination of a plurality of the removed portions gripped by a combination of the gripping means substantially equal to the preprogrammed weight and to actuate the combination of removed, gripping means to release the combination of gripped portions, computing the recorded weights to combine the recorded weights to give a total weight of a combination of a plurality of the removed portions gripped by a combination of the gripping means substantially equal to the preprogrammed weight and then, actuating the combination of the gripping means to release the combination of removed, gripped portions which give the total weight from the combination of gripping means.

* * * * *

UNITED STATES PATENT AND TRADEMARK OFFICE
CERTIFICATE OF CORRECTION

PATENT NO. : 5,321,212
DATED : June 14, 19994
INVENTOR(S) : Lars G. A. WADELL

It is certified that error appears in the above-indentified patent and that said Letters Patent is hereby corrected as shown below:

Column 1, line 62, change "arcuate" to --actuate--.

Column 2, line 29, change ",ripping," to --gripping--.

Column 2, line 30, after "portion", insert --from the--, and then, after "product", delete "from the".

Column 2, line 56, change "DRAWINGS" to --DRAWING--.

Column 2, line 61, change "A-A" to --5-5--.

Column 3, line 10, change "comprising" to --comprises--.

Figure 2:
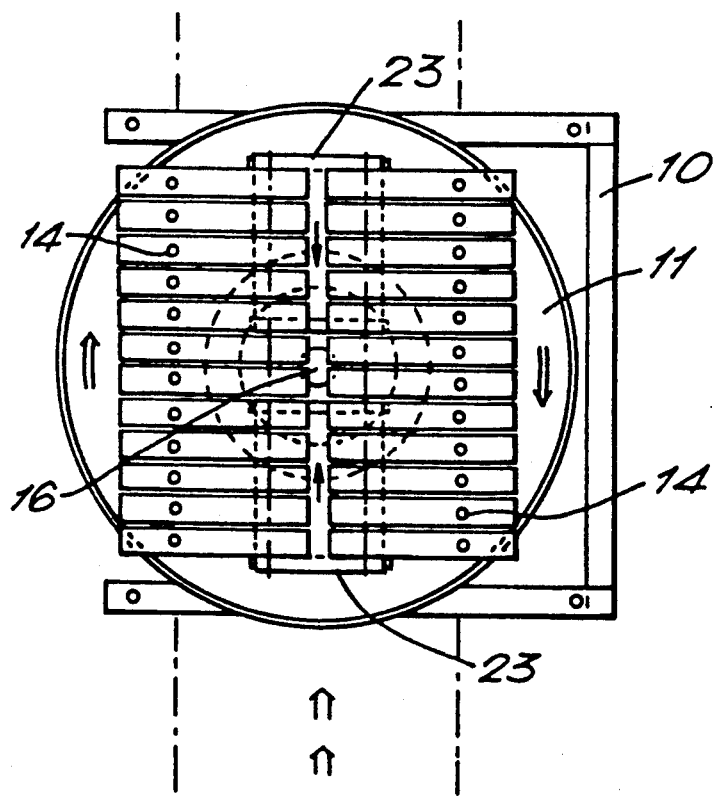
FIG. 2 is a section along the A—A of FIG. 1 looking in the direction of the arrows.
Figure 3:
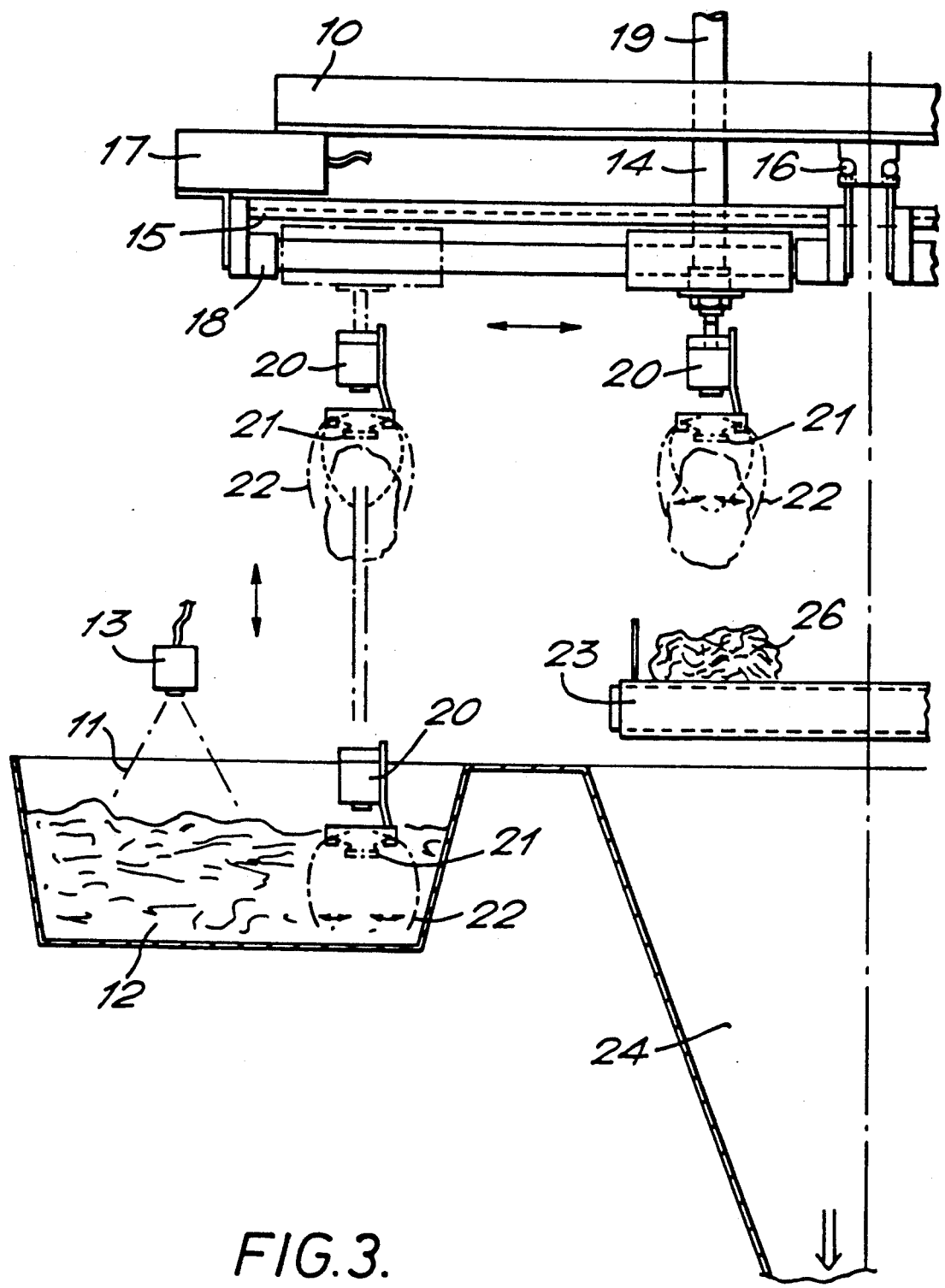
FIG. 3 is a sectional side view of part of the apparatus shown in FIG. 1 on a larger scale.
Figure 4:
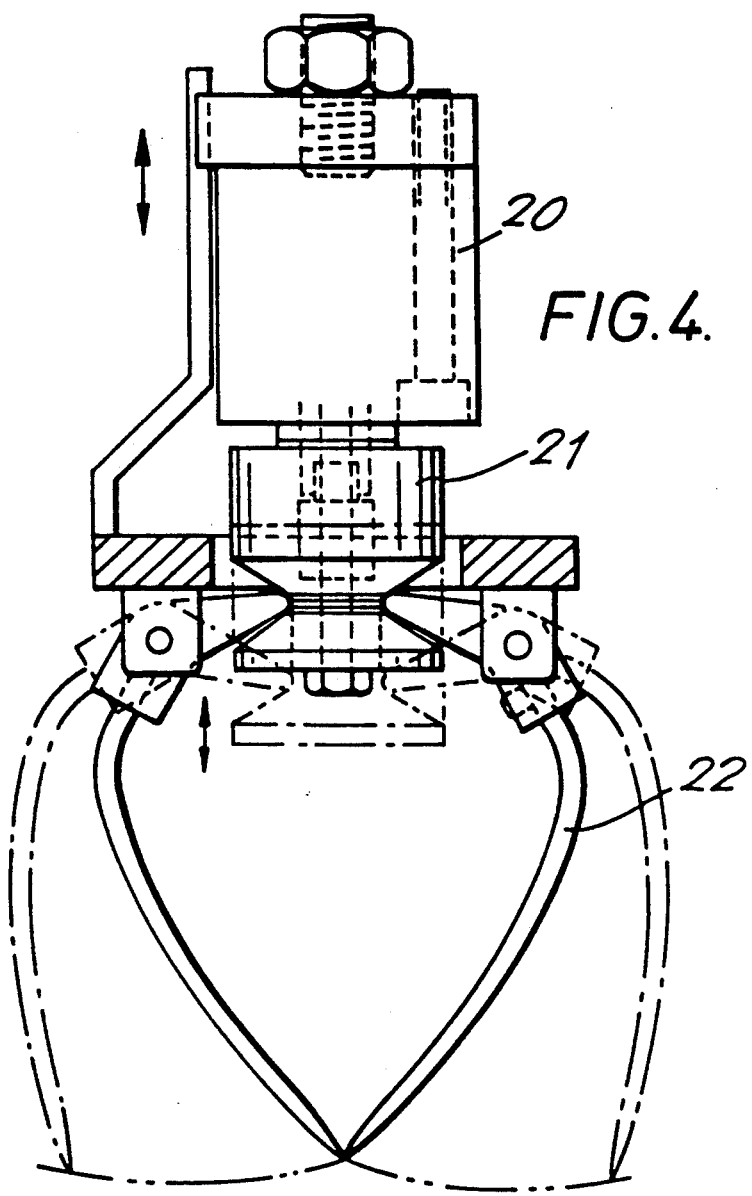
FIG. 4 is a sectional side view of a picking unit shown in more detail.
Figure 5:
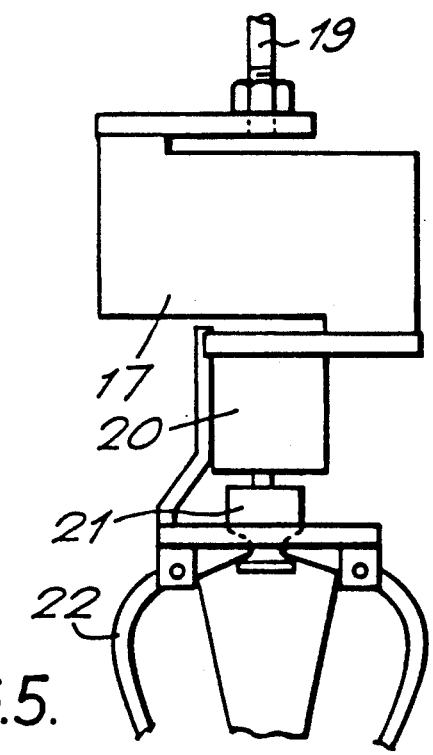
FIG. 5 is a sectional side view of an alternative construction of a picking unit.

Column 3, line 18, change "(Figured)" to --(Figure 2)--.

UNITED STATES PATENT AND TRADEMARK OFFICE
CERTIFICATE OF CORRECTION

PATENT NO. : 5,321,212
DATED : June 14, 1994
INVENTOR(S) : Lars G. A. WADELL

It is certified that error appears in the above-indentified patent and that said Letters Patent is hereby corrected as shown below:

Column 4, line 20 (line 3 of claim 5) change "descent" to --descend--.

Column 4, line 21 (line 4 of claim 5) change "ascent" to --ascend--.

Signed and Sealed this

Thirteenth Day of September, 1994

Attest:

BRUCE LEHMAN

Attesting Officer

Commissioner of Patents and Trademarks